March 24, 1970  A. M. ARCHER  3,502,883
PHOTOELECTRIC MOTION DETECTOR WITH A PAIR OF PHOTOCELLS
VIEWING DIFFERENT PARTS OF THE FIELD
Original Filed April 16, 1965
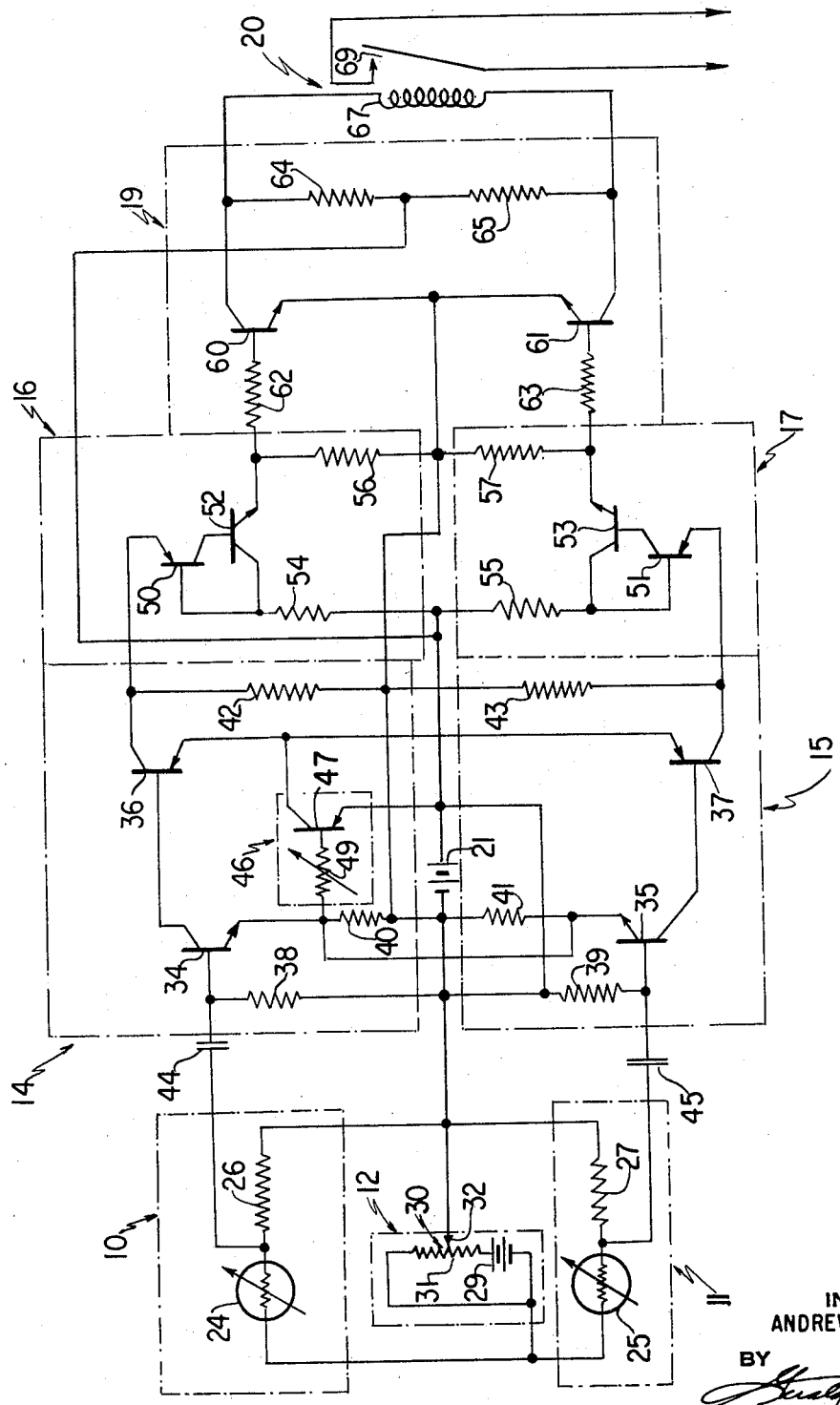
INVENTOR
ANDREW M. ARCHER
BY
AGENT United States Patent Office 3,502,883
Patented Mar. 24, 1970

3,502,883
PHOTOELECTRIC MOTION DETECTOR WITH A PAIR OF PHOTOCELLS VIEWING DIFFERENT PARTS OF THE FIELD
Andrew M. Archer, New York, N.Y., assignor to Specialties Development Corporation, Belleville, N.J., a corporation of New Jersey
Continuation of application Ser. No. 448,682, Apr. 16, 1965. This application Sept. 11, 1968, Ser. No. 781,651
Int. Cl. H01j 39/12
U.S. Cl. 250—210                                    4 Claims

ABSTRACT OF THE DISCLOSURE

An ambient light photoelectric motion detector wherein a pair of photocells viewing different portions of a field of view each operate a switching circuit when the light in the portion viewed changes in a predetermined direction. The outputs of the switching circuits are connected into a bridge amplifier so that the amplifier produces an output when only one of the photocells experiences a change in light level in the predetermined direction and produces no output when both of the photocells experience light level changes in the predetermined direction of either equal or unequal magnitudes.

CROSS-REFERENCES TO RELATED APPLICATION

This is a continuation of application Ser. No. 448,682 filed Apr. 16, 1965.

The present invention relates to photoelectric motion detectors for monitoring a field of view, and, more particularly, to such detectors which respond to a change in the light pattern within the field of view.

In the past, systems have been proposed for detecting moving bodies wherein separate portions of a field of view are viewed by photoelectric means, and the output signals developed due to the light values present within these portions of the field of view are balanced against one another in a bridge circuit. The output of the bridge circuit is connected to an indicating device which is actuated whenever a moving body entering the field of view changes the light pattern and thereby causes an unbalance in the bridge circuit. Such systems are able to ignore normal variations in the level of ambient light provided that all portions of the field of view experience equal changes in light level so that the bridge circuit remains balanced.

When a light is switched on or off in a room or when window blinds are opened or closed, the light level in every portion of the room will change in the same direction. However, all portions of the room will not experience the same degree of change in light level because the light strikes different portions of the room at different angles, because some portions of the room are closer to the light source than are others, and because the shadow patterns in the room change when a light source is illuminated or extinguished.

These previously known systems could be employed in an area subject to such normal non-uniform light changes only when the field of view was limited to a small portion of the area which always experiences uniform changes in illumination.

Accordingly, it is an object of the present invention to provide a highly sensitive photoelectric motion detector which is not subject to the foregoing difficulties.

Another object is to provide such a detector which responds only when one portion of the area being supervised experiences a change in light level in a direction not experienced by other portions of the area.

Another object is to provide such a detector which is insensitive to variations in the light level within the supervised area when all such variations are in the same direction.

Another object is to provide such a detector which compares the light level in two portions of the area being supervised and responds only when the light level in only one portion of the area changes in a predetermined direction.

Another object is to provide such a detector which does not respond when the light level in the two portions of the area change in the same direction simultaneously.

A further object is to provide such a detector which is simple, compact, and inexpensive to manufacture.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing apparatus for detecting motion within an area under surveillance which apparatus comprises a first photoelectric device for viewing a first portion of the area and responding to the light impinging thereupon from the first portion of the area to produce an output, a second photoelectric device for viewing a second portion of the area and responding to the light impinging thereupon from the second portion of the area to produce an output, an electrically operable device for giving an indication, means connected to the first and second photoelectric devices and responsive to the outputs of the photoelectric devices for detecting the direction of any change in the level of the light impinging upon the photoelectric devices, and means connected to the electrically operable device and to the last mentioned means for operating the electrically operable device when only one of the photoelectric devices experiences a light change in a predetermined direction and for maintaining the electrically operable device in the unoperated condition when both of the photoelectric devices experience light changes in the same direction.

A preferred embodiment of the invention has been chosen for purposes of illustration and description, and is shown in the accompanying drawing, forming a part of the specification, wherein:

The single figure of the drawing is a circuit diagram of a motion detector according to the present invention.

Referring to the drawing in detail, there is shown a motion detector which generally comprises first and second sensor network 10 and 11, an adjustable power supply 12 for the sensors, first and second amplifier circuits 14 and 15, first and second switching circuits 16 and 17, a bridge amplifier type circuit 19, a relay 20, and a second source of power 21.

Each of the sensor networks 10 and 11 includes a photosensitive cell 24 and 25, respectively, connected in series with a resistor 26 and 27, respectively, across the adjustable power supply 12.

The adjustable power supply 12 includes a source of direct current power 29 and a potentiometer 30 having a resistance 31 and a sliding tap 32 engaging the resistance 31. The resistance 31 is connected across the direct current source 29, and the networks 10 and 11 are connected between the negative terminal of the source 29 and the sliding tap 32.

The amplifier circuits 14 and 15 respectively include a first stage NPN transistor 34 and 35, a second stage PNP transistor 36 and 37, a biasing resistor 38 and 39 and an emitter resistor 40 and 41 for the first stage transistor, and a load resistor 42 and 43 for the second stage transistor.

The base electrodes of the transistors 34 and 35 are respectively connected through capacitors 44 and 45 to the junction of the cell 24 and the resistor 26 and to the junction of the cell 25 and the resistor 27.

The biasing resistors 38 and 39 are respectively connected between the base electrodes of the transistors 34 and 35 and the positive terminal of the power source 21, and the emitter resistors 40 and 41 are respectively connected between the emitter electrodes of the transistor 34 and 35 and the negative terminal of the second power source 21. The collector electrodes of the transistors 34 and 35 are connected to the base electrodes of the transistors 36 and 37 respectively, and the load resistors 42 and 43 are respectively connected between the collector electrodes of the transistors 36 and 37 and the negative terminal of the power source 21. The negative terminal of the power source 21 is also connected to the sliding tap 32 of the potentiometer 30.

A stabilizing network 46 is connected between the positive terminal of the second power source 21 and the emitter electrodes of the transistors 36 and 37. The network 46 includes a PNP transistor 47 and a variable resistor 49. The variable resistor 49 is connected between the base electrode of the transistor 47 and the emitter electrodes of the transistors 34 and 35. The collector electrode of the transistor 47 is connected to the emitter electrodes of the transistors 36 and 37, and the emitter electrode of the transistor 47 is connected to the positive terminal of the power source 21.

The switching circuits 16 and 17 respectively include a PNP transistor 50 and 51, an NPN transistor 52 and 53, a resistor 54 and 55, and a resistor 56 and 57. The base electrodes of the transistors 50 and 51 are connected through the resistors 54 and 55 respectively to the positive terminal of the second power source 21, the emitter electrodes of the transistors 50 and 51 are respectively connected to the collector electrodes of the transistors 36 and 37, the base electrodes of the transistors 52 and 53 are respectively connected to the collector electrodes of the transistors 50 and 51, and the collector electrodes of the transistors 52 and 53 are directly connected to the base electrodes of the transistors 50 and 51 respectively. The emitter electrodes of the transistors 52 and 53 are respectively connected through the resistors 56 and 57 to the negative terminal of the power source 21.

The bridge amplifier type circuit 19 includes a pair of NPN transistors 60 and 61, a pair of resistors 62 and 63, and a pair of resistors 64 and 65. The base electrodes of the transistors 60 and 61 are respectively connected through the resistors 62 and 63 to the emitter electrodes of the transistors 52 and 53. The emitter electrodes of the transistors 60 and 61 are each connected to the negative terminal of the second power source 21, and the collector electrodes of these transistors are connected through the resistors 64 and 65, respectively, to the positive terminal of the power source 21.

The relay 20 includes a winding 67 connected between the collector electrodes of the transistors 60 and 61, and a pair of contacts 69 connected to an indicating network (not shown).

In operation, the photosensitive cells 24 and 25 are positioned so that they view different portions of a field of view. If required, the light from these portions of the field of view may be directed to the cells through a lens system which may comprise either separate lenses for the two cells or a single lens for both cells. The portions of the field of view viewed by the cells may be adjacent or spaced from each other.

In the embodiment shown in the drawing, the cells 24 and 25 are of the photoresistive type and therefore change in resistance as the intensity of the light impinging thereon changes. The cells 24 and 25 cooperate with the resistances 26 and 27 connected in series therewith to divide the voltage impressed across the sensor networks 10 and 11. Therefore, in each of these networks the voltage at the junction of the cell and the resistor changes in response to changes in the intensity of the light impinging on the cell. When the light intensity increases the resistance of the cell decreases and the voltage at the junction of the cell and the resistor becomes more negative. When the intensity of the light decreases, the resistance of the cell increases and the voltage at the junction of the cell and the resistor becomes more positive.

The first power supply 12 is adjusted to provide the sensitivity desired. If it is desired that the detector operate when the ambient light is at a very low level, the sliding top 32 is moved toward the positive pole of the direct current source 29 to increase the voltage impressed across the sensor networks 10 and 11.

The transistors in the amplifier circuits 14 and 15 are biased to be normally non-conducting, and, when the amplifier circuits are in this condition, the switching circuits 16 and 17 are in their off (open circuit) condition, the transistors 60 and 61 are non-conducting, and no current flows in the coil 67 of the relay 20.

When a cell 24, 25 experiences a rapid increase in light intensity, its resistance drops and its capacitor 44, 45 responds by changing the charge thereon to compensate for the change in potential in the sensor network 10 or 11. This adjustment in the charge on the capacitor causes a current to flow which temporarily turns on the transistor 34, 35 which in turn places the transistor 36, 37 in full conduction. As a result, the transistors in the respective switching circuit 16, 17 are turned on and the transistor 60, 61 connected thereto is rendered conductive.

When the charge on the capacitor 44, 45 has adjusted to the new potential in the sensor network, the transistor 34, 35 turns off and the detector returns to its normal condition.

If this increase in light intensity is due to the movement into the field of view of an object of lighter color, for example, an intruder wearing clothing lighter in color than the background he obscures, then only one cell at a time will be effected by his presence. The first effected cell will cause the associated transistor 60 or 61 to be turned on to give an indication. For example, if the cell 24 is effected by the light change, it will cause the transistor 60 to be turned on. Current will then flow from the positive terminal of the power source 21 through the resistor 64 and the collector-emitter circuit of the transistor 60 to the negative terminal of the power source 21. Current will also flow from the positive terminal of the power source 21 through the resistor 65 and the winding 67 to the collector of the transistor 60. The current flow through the winding 67 causes the contacts 69 to close and operate the indicating network (not shown).

If an object of darker color, for example, an intruder wearing clothing darker than the background he obscures, enters the field of view of, for example, the cell 24, the transistor 34 will be biased further against conduction and the system is not effected. However, the capacitor 44 rapidly changes its charge to adjust to the potentials resulting from the decreased light intensity and when the object leaves the field of view of the cell 24, the cell 24 experiences an increase in light intensity (back to the previous value) and the capacitor 44 readjusts its charge to turn on the transistor 34 and thereby cause the transistor 60 to turn on and thereby actuate the relay 20 to produce an indication.

When both the cells 24 and 25 simultaneously experience an increase in light intensity both of the transistors 34 and 35 are turned on causing both of the transistors 36 and 37 to go into full conduction with the result that both switching circuits 16 and 17 operate placing both transistors 60 and 61 in full conduction. Equal currents will then flow through the resistor 64 and the transistor 60 and through the resistor 65 and the transistor 61 placing the collectors of the transistors 60 and 61 at equal potentials so that no current flows through the winding 67 and no indication is given. This sequence of events takes place whether the cells 24 and 25 are exposed to equal or vastly different increases in light intensity.

When both cells 24 and 25 simultaneously experience a decrease in light intensity both of the transistors 34 and 35 are temporarily driven further from conduction and both of the transistors 60 and 61 remain in their cut-off condition so that no indication is given.

It was found that preliminary embodiments of the detector, which did not contain the stability network 46, would sometimes give a false indication when the cells were exposed to changes in light intensity resulting from the switching on or off of fluorescent lights. It was discovered that the addition of the network 46 together with the addition of the conductor interconnecting the emitters of the transistors 34 and 35 prevented these false indications without reducing the effectiveness of the detector. The transistor 47 of the network 46 is connected into the emitter circuits of the transistors 36 and 37, and is biased to be normally conducting.

In the foregoing, the transistors in the amplifier circuits 14 and 15 and in the switching circuits 16 and 17 are described as being normally non-conducting and arranged to become conducting when the light level increases, however, it is to be understood that the circuits 14 through 17 can be arranged so that they are turned on by a decrease in light level or they can be arranged so that they are normally conducting and are turned off by a change in the light level in a predetermined direction.

Further, it is to be understood that the circuit can be readily modified to utilize photovoltaic cells in place of the photoresistive cells described hereinbefore.

It will be seen from the foregoing description, that the present invention provides a simple, compact, inexpensive, and highly sensitive motion detector which responds to ambient light changes resulting from motion within the supervised area but does not respond to other light changes.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

What is claimed is:
1. Light responsive motion detecting apparatus for use in monitoring an area containing first and second portions which normally experience simultaneous light changes of different degrees in the same direction, which apparatus comprises a first photoelectric device for viewing said first portion of said area and for producing an output which varies with the light level impinging on said first device, a second photoelectric device for viewing said second portion of said area and for producing an output which varies with the light level impinging on said second device, first and second switching means each having a normal and an operated state, one of said states being non-conducting and the other of said states being fully conducting, first circuit means connected between said first photoelectric device and said first switching means for changing said first switching means from its normal state to its operated state only when said first device experiences a light change in a predetermined direction, a second circuit means connected between said second photoelectric device and said second switching means for changing said second switching means from its normal state to its operated state only when said second device experiences a light change in said predetermined direction, an electrically operable device for giving an indication, and means connecting said first and second switching means and said electrically operable device for operating said electrically operable device when only one of said switching means is in its operated state and for maintaining said electrically operable device unoperated when both of the switching means are in the same state.

2. Apparatus according to claim 1 wherein said first and second circuit means each include an amplifier each of said amplifiers being biased so as to produce a change in output only when the photoelectric device associated therewith experiences a light change in said predetermined direction.

3. Apparatus according to claim 1 including a bridge circuit having input terminals for connection across a source of electrical power and having output terminals connected across said electrically operable device, said first and second switching means being connected as arms of said bridge so that current flows between said source terminals and said electrically operable device only when only one of said switching means is in its operated state.

4. Apparatus according to claim 2 wherein said amplifiers are connected to said photoelectric devices by rate sensitive means so that the apparatus is insensitive to slow changes in the intensity of ambient light.

References Cited

UNITED STATES PATENTS

| | | | |
|---|---|---|---|
| 2,648,251 | 8/1953 | Puster | 250—210 X |
| 2,701,356 | 2/1955 | Coleman | 250—209 X |
| 2,736,813 | 2/1956 | Cherrier | 250—210 X |
| 2,842,672 | 7/1958 | Thomsen | 250—210 X |
| 2,843,756 | 7/1958 | Wise et al. | 250—210 |
| 3,354,311 | 11/1967 | Vali et al. | 250—210 X |
| 3,363,177 | 1/1969 | Houghton. | |

ROBERT SEGAL, Primary Examiner

C. R. CAMPBELL, Assistant Examiner

U.S. Cl. X.R.

250—209; 317—148.5